(12) United States Patent
Chakraborty et al.

(10) Patent No.: US 11,087,026 B2
(45) Date of Patent: Aug. 10, 2021

(54) DATA PROTECTION BASED ON EARTH MOVER'S DISTANCE

(71) Applicant: International Business Machines Corporation, Armonk, NY (US)

(72) Inventors: Supriyo Chakraborty, White Plains, NY (US); Mudhakar Srivatsa, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 355 days.

(21) Appl. No.: 16/279,453

(22) Filed: Feb. 19, 2019

(65) Prior Publication Data
US 2020/0265163 A1 Aug. 20, 2020

(51) Int. Cl.
*G06F 21/62* (2013.01)
*H04L 29/06* (2006.01)
(Continued)

(52) U.S. Cl.
CPC ........ *G06F 21/6254* (2013.01); *G06F 21/602* (2013.01); *H04L 41/12* (2013.01);
(Continued)

(58) Field of Classification Search
CPC ... G06F 21/6254; G06F 21/602; H04L 41/12; H04L 41/145; H04L 43/045; H04L 63/0428
See application file for complete search history.

(56) References Cited

U.S. PATENT DOCUMENTS

| 9,032,527 B2* | 5/2015 | Manadhata | H04L 63/145 |
| | | | 726/24 |
| 2015/0049634 A1* | 2/2015 | Levchuk | G06Q 50/01 |
| | | | 370/254 |

(Continued)

FOREIGN PATENT DOCUMENTS

WO 2017194214 A1 11/2017

OTHER PUBLICATIONS

Dieci, L., et al., "The Boundary Method for Semi-Discrete Optimal Transport Partitions and Wasserstein Distance Computation", arXiv:1702.03517v2, May 1, 2017, 29 pages.
(Continued)

*Primary Examiner* — Arvin Eskandarnia
(74) *Attorney, Agent, or Firm* — Scully, Scott, Murphy & Presser, P.C.; Daniel P. Morris

(57) ABSTRACT

Methods and systems of determining a data protection level of a dataset are described. In an example, a processor may encode a dataset and generate a network model of the encoded dataset. The processor may sort a set of edges of the network model based on a descending order of costs of the set of edges. The processor may determine a flow for a first edge among the sorted edges, the first edge may be an edge associated with the least cost. The processor may performing the determining of flows for the other edges in accordance with the descending order of the sorted edges. The processor may determine a metric based on the determined flows of the sorted edges and based on the costs of the sorted edges. The processor may compare the metric with a threshold to determine a level of data protection provided by the encoded dataset.

20 Claims, 7 Drawing Sheets

(51) Int. Cl.
*H04L 12/24* (2006.01)
*H04L 12/26* (2006.01)
*G06F 21/60* (2013.01)

(52) U.S. Cl.
CPC .......... *H04L 41/145* (2013.01); *H04L 43/045* (2013.01); *H04L 63/0428* (2013.01)

(56) References Cited

U.S. PATENT DOCUMENTS

| | | |
|---|---|---|
| 2018/0103084 A1 | 4/2018 | Auvenshine et al. |
| 2018/0262519 A1 | 9/2018 | Arunkumar et al. |
| 2019/0188308 A1* | 6/2019 | Simon .................... G06F 16/219 |

OTHER PUBLICATIONS

Ling, H., et al., "An Efficient Earth Mover's Distance Algorithm for Robust Histogram Comparison," in IEEE Transactions on Pattern Analysis and Machine Intelligence, May 2007, pp. 840-853, vol. 29, No. 5.

Tang, Y., et al., "Earth Mover's Distance based Similarity Search at Scale," Proceedings of the VLDB Endowment, Dec. 2013, pp. 313-324, vol. 7, Issue 4.

Li, N., et al., "t-Closeness: Privacy Beyond k-Anonymity and l-Diversity," 2007 IEEE 23rd International Conference on Data Engineering, Apr. 15-20, 2007, pp. 106-115.

Cao, J., et al., "SABRE: a Sensitive Attribute Bucketization and REdistribution framework for t-closeness." The VLDB Journal, Revised Apr. 7, 2010, Accepted Apr. 19, 2010, Published online May 19, 2010, pp. 59-81, vol. 20.

Bhattacharyya, D., et al., "High Privacy for Data Disclosures Using Tree-EMD," 2015 8th International Conference on Advanced Software Engineering & Its Applications (ASEA), Nov. 25-28, 2015, pp. 13-17.

NIST, "NIST Cloud Computing Program", http://csrc.nist.gov/groups/SNS/cloud-computing/index.html, Created Dec. 1, 2016, Updated Oct. 6, 2017, 2 pages.

\* cited by examiner

DATA PROTECTION BASED ON EARTH MOVER'S DISTANCE

BACKGROUND

The present application relates generally to computers, and computer applications, and more particularly to computer-implemented methods and systems relating to data protection systems, such as data encoding or encryption systems.

Information sanitization techniques, such as data anonymization, are implemented for data protection purposes. Such techniques may involve encrypting datasets or removing sensitive information from datasets to protect particular data items of the datasets. Upon the anonymization of datasets, the datasets may be transferred among different devices with a reduced risk of undesirable disclosure of sensitive information.

SUMMARY

In some examples, a method of determining whether a dataset satisfies a data protection requirement is generally described. The method may include generating, by a processor, a network model of a dataset. The network model may provide a set of first nodes representing a first distribution of an attribute among a portion of the dataset. The network model may further provide a set of second nodes representing a second distribution of the attribute among the dataset. The network model may further provide a set of edges, where an edge may connect one of the first nodes to one of the second nodes. The set of edges may be directed from a connected first node to a connected second node. The set of edges may correspond to a set of costs. The method may further include sorting, by the processor, the set of edges based on a descending order of the set of costs. The method may further include determining, by the processor, a flow for a first edge among the sorted edges based on the set of first nodes and the set of second nodes. The first edge may correspond to a least cost, and the flow may be a portion of a mass of a first node connected by the first edge. The method may further include iteratively performing, by the processor, the determining of flows for the other edges among the sorted edges and in accordance with the descending order of the sorted edges. The method may further include determining, by the processor, a metric based on the determined flows of the sorted edges and based on the costs of the sorted edges. The method may further include determining, by the processor, a level of data protection provided by the dataset based on a result of a comparison of the metric with a threshold.

In some examples, a system effective to determine whether a dataset satisfies a data protection requirement is generally described. The system may include a memory and a hardware processor configured to be in communication with each other. The hardware processor may be configured to generate a network model of a dataset. The network model may provide a set of first nodes representing a first distribution of an attribute among a portion of the dataset. The network model may further provide a set of second nodes representing a second distribution of the attribute among the dataset. The network model may further provide a set of edges, where an edge may connect one of the first nodes to one of the second nodes. The set of edges may be directed from a connected first node to a connected second node. The set of edges may correspond to a set of costs. The hardware processor may be further configured to sort the set of edges based on a descending order of the set of costs corresponding to the set of edges. The hardware processor may be further configured to determine a flow for a first edge among the sorted edges based on the set of first nodes and the set of second nodes. The first edge may correspond to a least cost. The flow may be a portion of a mass of a first node connected by the first edge. The hardware processor may be further configured to iteratively perform the determination of flows for the other edges among the sorted edges and in accordance with the descending order of the sorted edges. The hardware processor may be further configured to determine a metric based on the determined flows of the sorted edges and based on the costs of the sorted edges. The hardware processor may be further configured to determine a level of data protection provided by the dataset based on a result of a comparison of the metric with a threshold.

In some examples, a computer program product for determining whether a dataset satisfies a data protection requirement is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Data anonymization may include implementing various techniques to encode and/or encrypt data items in a dataset. Different techniques to encode datasets may satisfy different data protection requirements. Computer devices and various algorithms may be implemented to determine and analyze differences between probability distributions of the encoded data items among the encoded datasets. These differences between distributions may be used as a metric to determine whether the encoded dataset satisfy particular data protection requirements. A probability distribution of a dataset reflects the normalized frequency in which particular data items occur within the dataset. A distance between two probability distributions is used to compute the similarity between two datasets. In some examples, events that define the probability distributions are embedded within a metric space. Thus, similarity between the probability distributions may no longer be restricted to comparing the values in the range space [0,1], and may also involve comparing the distance between the events themselves.

A determination of the Earth Movers Distance (EMD) (which is also the first-order Wasserstein distance), can be used to compare the events, and is used to compute the distance between two probability distributions over a region D. In data protection systems, EMD may be used to determine the similarity between probability distributions, and the similarity based on EMD may be used as a metric to determine whether an encoded dataset satisfy particular data protection requirements. For example, a data protection requirement may be a requirement for a dataset to achieve t-closeness. A class of a table (or a partition of a dataset) is said to have t-closeness if the distance between a distribution of an attribute in this class and the distribution of the attribute in the entire table is no more than a threshold t. A table or dataset is said to have t-closeness if all equivalence classes have t-closeness. Thus, if EMD values of a dataset fulfill the t-closeness requirement, then the dataset may be considered as being encoded at a satisfactory data protection level.

The EMD formulation for probability distributions is also equivalent to a transportation problem—the minimum-cost flow problem (MCFP), which is an optimization problem to find a minimum cost to send a certain amount of flow through a flow network. Solutions for MCFPs, such as Cycle Canceling approach, Minimum mean cycling cancel, Network Simplex, may also be used to solve for computing the EMD metric. If the domain D is discrete, then EMD can also be solved as an instance of the transportation or flow problem. Different algorithms and techniques to determine EMD between probability distributions of datasets may have different complexity. For example, the Network Simplex based solutions may determine EMD at a complexity of $\mathcal{O}(n^3 \log(n))$, where n is the number of vertices or nodes in the flow network or graph.

Figure 1:
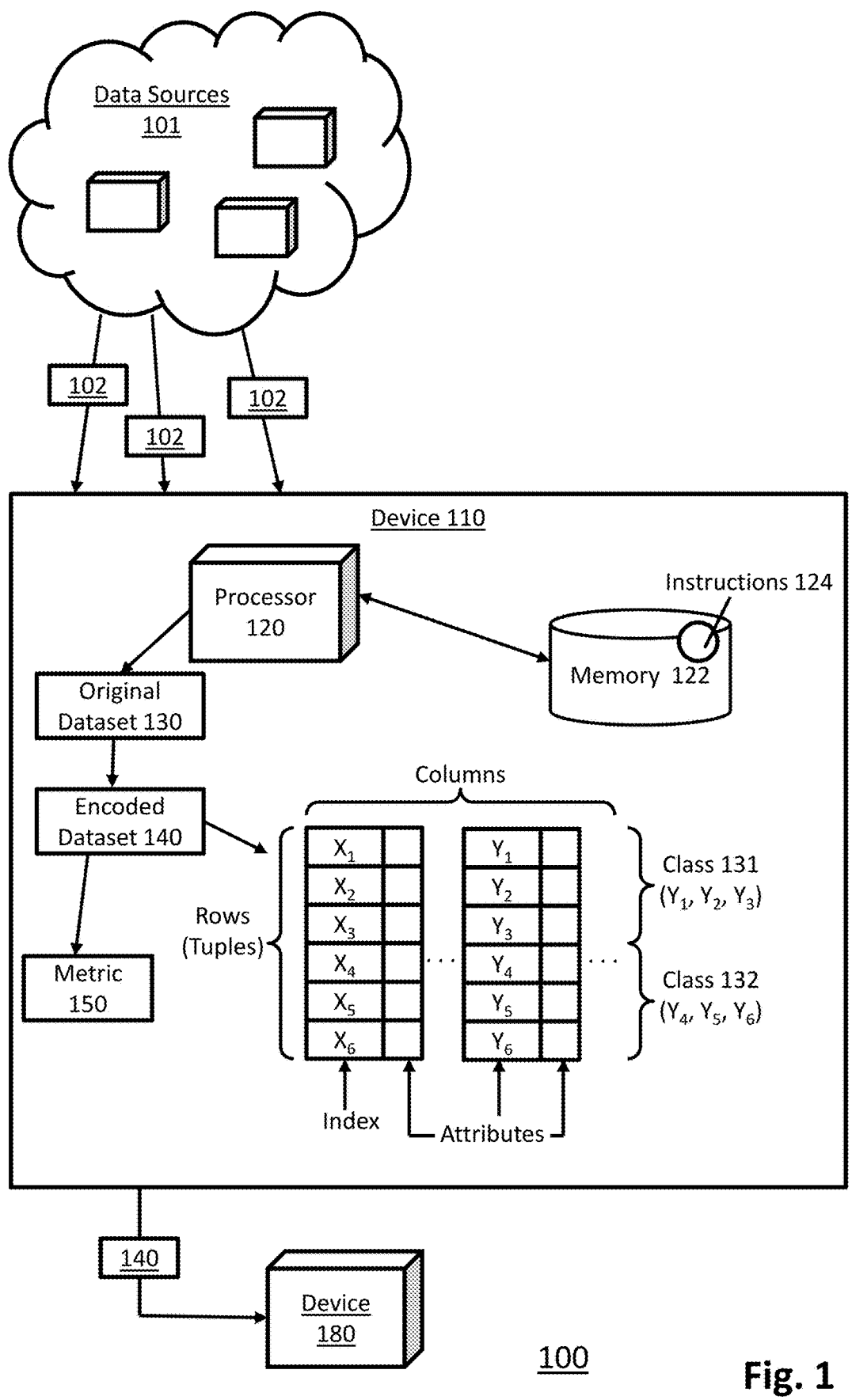
FIG. 1 illustrates an example computer system, in one embodiment, that can be utilized to implement a data protection based on earth mover's distance.

FIG. 1 illustrates an example computer system, in one embodiment, that can be utilized to implement a data protection based on earth mover's distance. A computer system 100 shown in FIG. 1 may be a data protection system integrated with a set of EMD computation instructions to determine whether an encoded dataset is encoded at a compliant protection level with respect to a data protection requirement. In some examples, the system 100 may be implemented in a computer device 110 ("device 110"). The device 110 may include a processor 120 and a memory 122 configured to be in communication with each other. In some examples, the processor 120 may be a central processing unit of the device 110, and may be configured to control operations of the memory 122 and/or other components of the device 110. In some examples, the system 100 and/or the device 110 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure. In some examples, the processor 120 and the memory 122 may be components of a cloud computing platform that may be employed to implement the methods described in accordance with the present disclosure.

The memory 122 is configured to selectively store instructions executable by the processor 120. For example, in one embodiment, the memory 122 may store a set of EMD computation instructions 124 ("instructions 124"), where the instructions 124 include instructions, such as executable code, algorithms or techniques relating to flow networks, graph theories, optimization problems, and/or other algorithms or techniques, which may implement the system 100. The processor 120 is configured to execute one or more portions of the instructions 124 in order to facilitate implementation of the system 100. In some examples, the instructions 124 may be packaged as a standalone application that may be installed on the device 110, such that the instructions 124 may be executed by the processor 120 to implement the system 100. For example, the device 110 may be originally configured to encode a dataset and output the encoded dataset to another device or platform. The integration of instructions 124 into the device 110 may provide additional functions to determine one or more metrics, use the metrics to determine a level of data protection provided by an encoded dataset, determine whether the level of data protection is compliant, and to determine whether it is safe to output the encoded dataset. In some examples, the instructions 124 may be stored in a programmable hardware component that may be integrated or embedded as part of the processor 120, such that the processor 120 may run the programmable hardware component to implement the system 100.

In an example embodiment, the device 110 may receive data items 102 from one or more data sources 101. Data sources 101 may include user devices such as computers, mobile phones, wearable devices, sensors, and/or other devices configured to collect information and data of one or more entities or users. A data item 102 may include sensitive and/or unsensitive information of a data owner. The processor 120 of the device 110 may collect the data items 102 and may aggregate the data items 120 into an original dataset 130. The processor 120 may store the original dataset 130 in the memory 122. In some examples, the processor 120 may implement information sanitization techniques to encode or encrypt the original dataset 130 and may store the encoded dataset 140 in the memory 122. For example, if the original dataset 130 includes user information and attributes such as a zip code "00001", the processor 120 may encode the original dataset 130 by replacing particular digits of the zip code with symbols, such as "0***1". In another example, the processor 120 may encode the original dataset 130 by assigning the zip code "00001" into a range, such as "00000-00010". By encoding the original dataset 130, the processor 120 generates encoded dataset 140 and stores the encoded dataset 140 in the memory 122.

The processor 120 may organize and store the original dataset 130 and the encoded dataset 140 as tables. FIG. 1 shows a table that represents the encoded dataset 140. The table representing the encoded dataset 140 may include a plurality of rows and columns. A row may be a tuple including an index, or key, denoted as $X_i$, that uniquely identifies the data in the corresponding row or tuple. A column may correspond to an attribute of the corresponding index (note the first column is reserved for the index $X_i$). The index $X_i$ may be indices assigned by the processor 120 and does not identify the data owner of the corresponding tuple. The encoded dataset 140 may be partitioned into equivalence classes 131, 132, where a class may be a partition including a set of tuples among the encoded dataset 140. In some examples, the partitioning of the encoded dataset 140 into classes may be based on a k-anonymity of the encoded dataset 140. A dataset is said to have the k-anonymity property if the information for tuples in the dataset cannot be distinguished from at least k−1 tuples with information also appear in the dataset. Thus, the encoded dataset 140 may be partitioned into a number of equivalence classes, where any X records in the same equivalence class may include the same quasi-identifier and are indistinguishable.

The encoded dataset 140 is said to have achieved t-closeness if, for a class of the encoded dataset 140, a distance between the distribution of an attribute in the class and the distribution of the attribute in the entire encoded dataset 140 is within a threshold t. A determination of whether a class of the encoded dataset 140 achieves t-closeness may include determining a distance measure between the equivalence class (e.g., zip codes between 00001-00009) and the global data (e.g., the entire encoded dataset 140). The distance measure to be determined may be the EMD between the distributions. In an example, consider two distributions {A: 0.5, B: 0.5} and {A: 0.7, B: 0.3}, a standard distance between these distributions (e.g., KL divergence) only matches A to A and B to B between the two distributions. However, the EMD may be different from the standard distance, and may accept a potentially asymmetric distance function between the elements of the distributions. For example, the EMD may correspond to differences or distances between pairs such as A to A, B to B, A to B and B to A. Therefore, EMD may be a distance measure that may be used in combination with t-closeness to verify whether an anonymization of an encoded dataset valid. In some examples, EMD may also be used during the process of anonymization to explore a range of options (e.g., should zip code be truncated to 0, 1, 2, 3, 4 or 5 digits).

Using the example shown in FIG. 1, a distribution of an attribute Y in the entirety of the encoded dataset 140 may be a first distribution, a distribution of Y in the class 131 may be a second distribution, and a distribution of Y in the class 132 may be a third distribution. If a difference between the first distribution and the second distribution, and a difference between the first distribution and the third distribution, are within the threshold t, then the encoded dataset 140 is said to have achieved t-closeness. In an example, for a particular attribute with binary values (e.g., yes or no), if a class with one hundred data items (rows) includes fifty "yes" and fifty "no", then a distribution of the particular attribute is {yes, no}={0.5, 0.5}. In another example, for a particular attribute with integer values ranging from 1 to 5, if a class with one hundred data items (rows) includes twenty data items of each integer value, then a distribution of the particular attribute is {1, 2, 3, 4, 5}={0.2, 0.2, 0.2, 0.2, 0.2}.

In some examples, it is desirable to minimize the distance between distributions of an attribute among a class and the distribution of the attribute among the entire encoded dataset. It may be desirable for the distributions to appear similar such that an entity having access to the encoded dataset cannot distinguish between the encoded data and the original data, and the original data cannot be derived from the encoded data. However, it is also not feasible for the distributions to be substantially identical. Thus, a value of the threshold t may depend on a desired application of the system 100 and/or the attributes original dataset. When the encoded dataset achieves t-closeness, the original dataset replaced by the encoded dataset has a reduced risk of being leaked due to the high similarity, or a high difficulty to distinguish between the original data and the encoded data.

In an example, a value of the threshold t may be 0.9. If a distribution of A and B in an equivalence class is {A: 0.49, B: 0.51}, and a distribution of A and B in the global data (e.g., the entire dataset) is {A: 0.5, B: 0.5}, then a difference, such as distance between the distributions, is substantially close. For example, the difference between the masses of A is 0.01 and the difference between the masses of B is also 0.01. Since t=0.9, this equivalence class may be deemed as achieving t-closeness because the differences of 0.01 indicates that the distributions are, for example, 1% dissimilar or 99% similar (or having a similarity degree of 0.99), which is above the threshold t=0.9. In another example, if the distribution of A and B in the equivalence class is {A: 0.1, B: 0.9}, then with t=0.9, it may be difficult for this equivalence class to achieve t-closeness because of significant differences between the distributions.

The processor 120 may be configured to execute instructions 124 to determine a metric 150, where the metric 150 may be based on a determination of an earth movers distance (EMD) of one or more attributes among the encoded dataset 140. The processor 120 may use the data among the encoded dataset 140 to formulate a transportation problem, such as a minimum-cost flow problem (MCFP). The processor 120 may execute the instructions 124 to determine solutions of the formulated transportation problem, where the solutions are EMD values that may be used by the processor 120 to determine the metric 150. The processor 120 may compare the metric 150 with the threshold t, which may be stored in the memory 122, to determine a level of data protection provided by the encoded dataset 140. Based on a result of the comparison, the processor 120 may determine whether the encoded dataset 140 is compliant or noncompliant with one or more data protection requirements.

For example, a data protection requirement may be a requirement to achieve t-closeness. If the encoded dataset 140 achieved t-closeness, the processor 120 may deem the encoded dataset 140 to be compliant with the data protection requirement and output the encoded dataset 140 to a device 180. For example, the processor 120 may publish the encoded dataset 140 to a big data platform. The determination of the encoded dataset 140 achieving t-closeness provides an additional layer of security measures by confirming the encoded dataset 140 can be published with minimal risk of undesirable disclosure of the sensitive information. In some examples, if the processor 120 determines that the encoded dataset 140 did not achieve t-closeness, the processor 120 may restrict an output of the encoded dataset 140, such as by not sending the encoded dataset 140 to the device 180. Further, if the processor 120 determines that the encoded dataset 140 did not achieve t-closeness, the processor 120 may perform other restrictive measures such as re-executing information sanitization techniques on the original dataset 130 to generate a new encoded dataset. The processor 120 may determine the metric 150 for the new encoded dataset and confirm whether the new encoded dataset achieved t-closeness to determine whether the new encoded dataset shall be published or output to the device 180.

In some examples, during a data anonymization process being performed on the original dataset 130, the verification of whether the dataset resulting from the anonymization process achieves t-closeness may be performed in a loop in the anonymization process. The loop of verifying whether each anonymization achieves t-closeness allows the system 100 to explore various tradeoffs between data protection degree and utility. For example, one might explore a space of anonymization options, such as whether a zip code should be truncated to 0, 1, 2, 3, 4 or 5 digits (the longer the zip code, the higher the utility or information content). Hence, a goal of maximizing utility and satisfying data protection constraint may be achieved by determining an optimal solution using the space of anonymization options provide by the loop of verifying whether each anonymization achieves t-closeness during the anonymization process.

Figure 2:
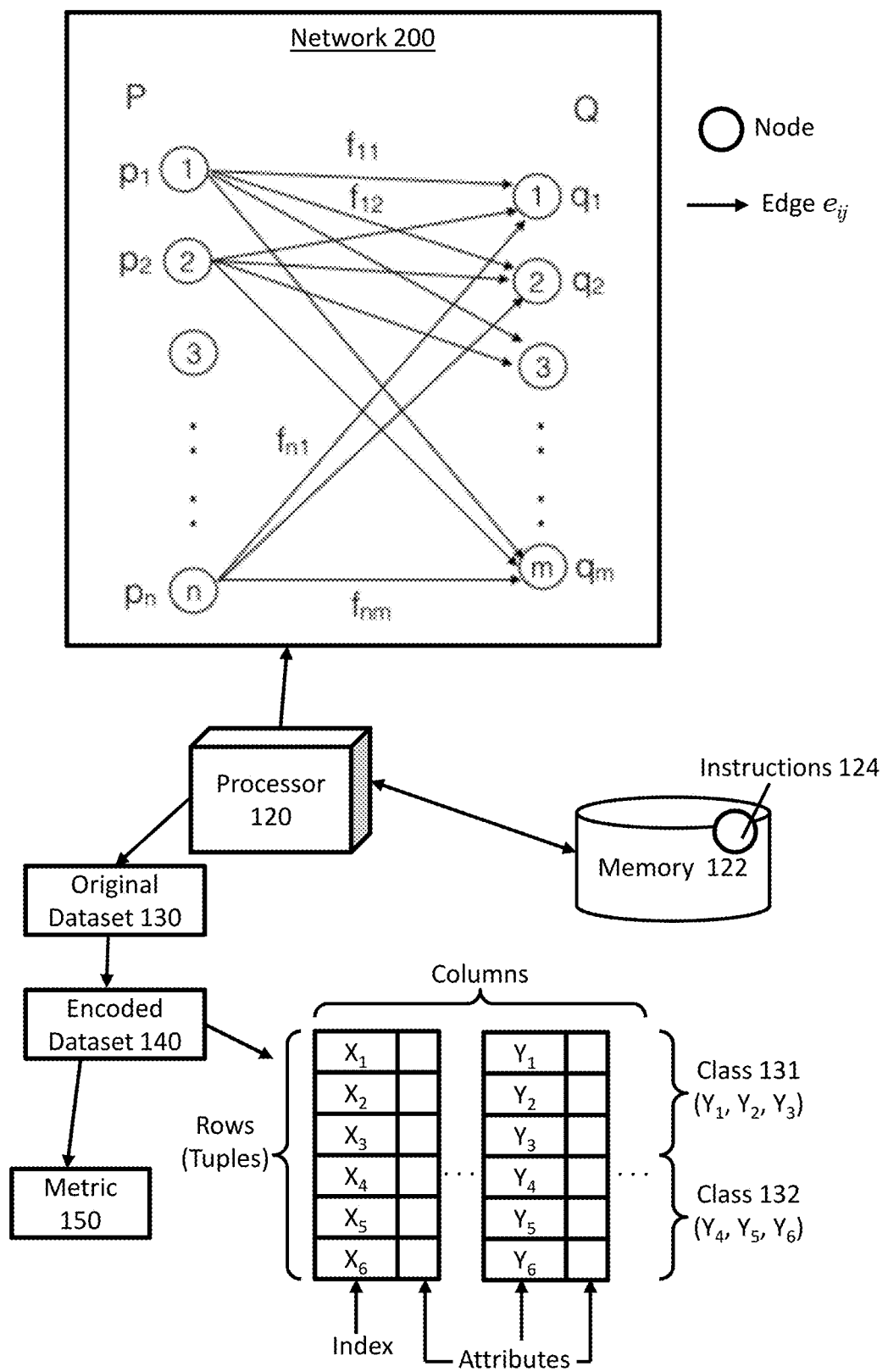
FIG. 2 illustrates a network of nodes and edges in accordance with an implementation of a data protection based on earth mover's distance, in one embodiment.

FIG. 2 illustrates a network of nodes and edges in accordance with an implementation of a data protection based on earth mover's distance, in one embodiment. FIG. 2 may include components that are labeled identically to components of FIG. 1, which will not be described again for the purposes of clarity. The description of FIG. 2 may reference at least some of the components of FIG. 1.

FIG. 2 illustrates a bipartite graph representing a flow network 200 of a minimum-cost flow problem (MCFP). A flow network may be a network model representing a network that provides or includes a plurality of nodes and directed edges indicating a direction of flow among the nodes. In the network 200, P={$p_1, p_2, \ldots p_n$} denotes a first distribution and Q={$q_1, q_2, q_2 \ldots q_m$} denotes a second distribution. Distributions P and Q are distributions over discrete domains $\mathcal{P}$ and $\mathcal{Q}$, respectively, such that $|\mathcal{P}|$=n and $|\mathcal{Q}|$=m. In some examples, the applications of EMD and/or t-closeness may not impose any constraints on the values of m or n. During the anonymization process of the original dataset 130, the value of m may be greater than n due to the set of possible values on the global data is more than the number of possible values in an equivalence class (which is a subset of the global data). In some examples, if the determination of EMD and verification of t-closeness is performed on the encoded dataset 140 in a loop (described above), then the set of sensitive attributes on the global data (that was used to train an anonymization model being used in the anonymization process) may be different from the dataset whose anonymity is being verified. In such cases it is possible for m to be less than n. Every directed edge $e_{ij}$ in the graph connects a node i in P with another node j in Q, and is associated with a cost $c_{ij} \in \mathbb{R}^+$, where the cost $c_{ij}$ may be a non-negative real valued number or an integer. Every edge $e_{ij}$ further supports a flow $f_{ij} \in [0, 1]$ from distribution P to Q where the cost of the flow is computed as $c_{ij} * f_{ij}$. In some example embodiments, a flow is a capacity of an edge. For example, in data communications, the flow of an edge may correspond to a bandwidth of a communication link. A cost of a flow may be a cost to move a flow from a node i in P to a node j in Q. For example, if a particular node i in P is S steps away from a particular node j in Q, a cost to move a flow may be based on the S steps (e.g., the further away are the nodes, the higher the cost to move a flow). A solution to the MCFP shown in FIG. 2A is to determine an assignment of maximum flows for every edge in the graph under the constraint that the total cost of the assigned flows is minimized.

The processor 120 may formulate a MCFP for the encoded dataset 140 by generating a network model (e.g., the network 200 shown in FIG. 2), determining probability mass of each attribute value of an attribute to be analyzed, and assign the probability mass to the nodes of the network model. In an example, for a particular attribute with binary values (e.g., yes or no), if a class includes one hundred data items, the processor 120 may count or tally a number of "yes" and "no" within the class to determine the probability mass (total count) of "yes" and "no". If a distribution of the attribute in the class is {yes, no}={0.5, 0.5}, the processor 120 may assign 0.5 to $p_1$ and 0.5 to $p_2$. If a distribution of the attribute the entire encoded dataset is {yes, no}={0.45, 0.55}, the processor 120 may assign 0.45 to $q_1$ and 0.55 to $q_2$. The processor 120 may execute the instructions 124 to determine a solution to the problem formulated based on the encoded dataset 140, where the determined solution may include EMD values. The EMD values may be used by the processor 120 to determine the metric 150. The processor 120 may use the metric 150 to determine whether the encoded dataset 140 fulfills particular data protection requirements, such as t-closeness.

A formulation of the MCFP of the network 200 is as follows:

$$\min \sum_{i=1}^{n} \sum_{j=1}^{m} c_{ij} f_{ij} \tag{1}$$

$$\text{s.t.} \sum_{i=1}^{n} f_{ij} = q_j \; \forall_j \in \{1, \ldots, m\} \tag{2}$$

$$\sum_{j=1}^{m} f_{ij} = p_i \; \forall_i \in \{1, \ldots, n\} \tag{3}$$

$$\sum_{i=1}^{n} \sum_{j=1}^{m} f_{ij} = 1 \tag{4}$$

$$\sum_{i=1}^{n} p_i = 1, \tag{5}$$

$$\sum_{i=1}^{n} q_j = 1, f_{ij} \geq 0, c_{ij} \in \mathbb{Z}^+, \forall_i \in \{1, \ldots, n\}, j \in \{1, \ldots, m\}$$

The objective in Eqn. (1) minimizes the total cost of all flows. The constraints in Eqns. (2) and (3) respectively ensures that the sum of outgoing flows from a node equals the probability mass of that node, and correspondingly the sum of all flows entering a node equals the capacity (or mass) of the node. Eqn. (4) maximizes the possible flows from P to Q. Finally, Eqn. (5), restricts valid flows to be positive or zero, edge costs to be integers, and expects P and Q to be valid distributions.

The Earth Mover's Distance (EMD) is denoted as the minimum cost of all flows normalized by the sum of the flows, such as:

$$EMD(P, Q) = \frac{\sum_{i=1}^{n} \sum_{j=1}^{m} c_{ij} f_{ij}}{\sum_{i=1}^{n} \sum_{j=1}^{m} f_{ij}} \tag{6}$$

which equals the objective in Eqn. (1).

The processor 120 may be configured to determine a lower bound on each flow that satisfied the constraints in Eqns. (2) through (5). The processor may isolate specific nodes of the network 200, such as $i \in P$ and $j \in Q$, using the equation:

$$f_{ij} + \sum_{k_1 \neq j} f_{ik_1} = p_i \tag{7}$$

where $k_1$ is any other element in $\mathcal{Q}$ different from j. Eqn. (7) may be expanded to:

$$f_{ij}+f_{ik_1}+\ldots+f_{ik_m}=p_i \quad (8)$$

For each flow denoted as $f_{ik_j}$ on Eqn. (8), where $k_j \neq j$, the follow constraints may be enforced by the processor 120:

$$f_{ik_1} + \sum_{l \neq i} f_{lk_1} = q_{k_1} \quad (9)$$

$$f_{ik_2} + \sum_{l \neq i} f_{lk_2} = q_{k_2} \quad (10)$$

$$\vdots$$

$$f_{ik_m} + \sum_{l \neq i} f_{lk_m} = q_{k_m} \quad (11)$$

The processor 120 may subtract Eqns. (9)-(11) from Eqn. (8) to obtain:

$$f_{ij} = p_i - \sum_{k \neq j} q_k + \sum_{l \neq i} \sum_{k \neq j} f_{lk} \quad (12)$$

Similarly, for the flow $f_{ij}$, Eqn. (2) may be rewritten as:

$$f_{ij} + \sum_{l_1 \neq i} f_{l_1 j} = q_j \quad (13)$$

where $l_1$ any other element in $\mathcal{P}$ different from i. Eqn. (13) may be expanded to:

$$f_{ij}+f_{l_1 j}+\ldots+f_{l_n j}=q_j \quad (14)$$

For each flow denoted as $f_{l_k j}$ in Eqn. (14), where $l_k \neq i$, the follow constraints may be enforced by the processor 120:

$$f_{l_1 j} + \sum_{k \neq j} f_{l_1 k} = p_{l_1} \quad (15)$$

$$f_{l_2 j} + \sum_{k \neq j} f_{l_2 k} = p_{l_2} \quad (16)$$

$$\vdots$$

$$f_{l_m j} + \sum_{k \neq j} f_{l_m k} = p_{l_n} \quad (17)$$

The processor may subtract Eqns. (15)-(17) from Eqn. (14) to obtain:

$$f_{ij} = q_j - \sum_{k \neq i} p_k + \sum_{l \neq i} \sum_{k \neq j} f_{lk} \quad (18)$$

Using Eqn. (12), $f_{ij}$ is lower bounded by max $(p_i - \Sigma_{k \neq j} q_k, 0)$. Similarly, using Eqn. (18), $f_{ij}$ is lower bounded by max $(q_j - \Sigma_{k \neq i} p_k, 0)$. A combination of these lower bounds yields a lower bound of a flow $f_{ij}$ as:

$$f_{ij} \geq \max\left(p_i - \sum_{k \neq j} q_k,\; q_j - \sum_{k \neq i} p_k,\; 0\right) \quad (19)$$

Using the formulation and derivation of the lower bound of the flow $f_{ij}$ at Eqn. (19), the processor 120 may execute instructions to compute Eqn. (19) to determine values of amount of flows in an Algorithm 1, shown in Table 1 below. The processor 120 may execute Algorithm 1 to determine a flow assignment among the edges in network 200 that may yield a solution that maximizes flow in each edge and minimize total cost.

TABLE 1

Algorithm 1
Algorithm 1 Greedy Strategy For Flow Assignment

Require:
    $H_p^i$ |← Hashmap storing all flow variables that sum to $p_i$ $\forall_i \in 1,\ldots,n$
    $H_q^j$ ← Hashmap storing all flow variables that sum to $q_j$ $\forall_j \in 1,\ldots,m$
    $F \in \mathbb{R}^{m \times n}$ ← flow matrix with all entries initialized to −1
    $E_s$ ← vector containing edges e(i, j) sorted in non-increasing order of cost $c_{ij}$
1: for each edge $e_{ij}$ in $E_s$ do
2:   if F[i][j] = −1 then
3:     F[i][j] ← LOWERBOUND(i, j)
4:     UPDATE(F[i][j], i, j, $H_p^i$, $H_q^j$)
5:   end if
6: end for Algorithm 1 shown in Table 1 describes a flow assignment strategy. There are several pre-computed variables that is used by Algorithm 1. A variable denoted as $H_p^i$ are a collection of hash maps that store all the variables that sum to $p_i$, for all i=1, . . . , n. The hash maps may be stored in the memory 122. Each hash map may represent the right-hand-side variables in Eqns. (15) through (17). Another variable denoted as $H_q^j$ are hash maps that store all the variables that sum to $q_j$, for all j=1, . . . , m. Another variable is a matrix denoted as $F \in \mathbb{R}^{m \times n}$, where the matrix F stores all the flows and is initialized to −1. A flow on the edge $e_{ij}$ is denoted by F[i][j] in Algorithm 1. The processor 120 may be configured to generate and update the hash maps. Another variable is a vector denoted as $E_s$, where the vector $E_s$ stores all the edges in a non-increasing (or decreasing) order of their cost. The sorting operation to sort the edges can be done in $\mathcal{O}(n^2 \log(n))$ time (e.g., under traditional HEAPSORT routine), where $\mathcal{O}(mn) = \mathcal{O}(n^2)$ and mn is the number of possible edges in the bipartite graph shown in FIG. 2A. The processor 120 may be configured to perform the sorting and store the sorted edges as vector $E_s$ in the memory 122.

The processor 120 may be configured to execute each instructions among Algorithm 1. The processor 120 may iteratively determine whether each edge among the vector $E_s$ is assigned with a flow (e.g., a value that may be a portion of a corresponding $p_i$ value or a probability mass of the corresponding i node). If an edge is not assigned with a flow, the processor 120 may determine a flow for the edge. Determination of the flow for the edge may include performing, by the processor 120, method calls to one of a LOWERBOUND function or an UPDATE function. The processor 120 may call the LOWERBOUND function to compute Eqn. (19) to determine a flow of an edge currently being set as the lower bound. The processor 120 may call the UPDATE function to update constraints and other flow values based on a result of the LOWEBOUND function. An Algorithm 2 that can be executed by the processor 120 to perform the UPDATE function is shown in Table 2 below.

TABLE 2

Algorithm 2
Algorithm 2 Cascading Update For
Satisfying Flow Constraints

```
 1: function UPDATE(F[i][j], i, j, H_p^i, H_q^j)
 2:   REMOVE(H_p^i, i, j); p_i ← p_i - F[i][j]
 3:   REMOVE(H_q^j, i, j); q_j ← q_j - F[i][j]
 4:   if |H_p^i| = 1 then
 5:     e(α, β) ← GET(H_p^i)
 6:     F[α][β] ← p_i
 7:     UPDATE(F[α][β], α, β, H_p^α, H_q^β)
 8:   end if
 9:   if |H_q^j| = 1 then
10:     e(α, β) ← GET(H_q^j)
11:     F[α][β] ← q_j
12:     UPDATE(F[α][β], α, β, H_p^α, H_q^β)
13:   end if
14: end function
```

In an example embodiment, each variable $f_{ij}$ that is set to the lower bound, can occur in two equations (one for $p_i$ and another for $q_j$). At lines 2 and 3 of the Algorithm 2 shown in Table 2, these variables are removed (e.g., by the processor 120) from the hash maps, and the values of $p_i$ and $q_j$ are accordingly adjusted (e.g., also by the processor 120). If the number of remaining elements in hash map $H_p^i$ is equal to one, it implies that all the variables forming that constraint equation has already been set, and the remaining variable can also now be set to the value of $p_i$ (Lines 4-6). A recursive call to UPDATE (Line 7) is made to handle the changes due to this new flow variable that was set. Similar checks and assignments are done for hash map $H_q^j$ (Lines 9-11) culminating in another potential recursive call in Line 12. Thus, a sequence of possible cascading changes are performed. Each call to UPDATE, performed by the processor 120, sets one flow variable.

The time complexity of the LOWERBOUND function to compute Eqn. 19 in $\mathcal{O}(n)$ time, and the UPDATE function for each edge, takes $\mathcal{O}(1)$ time (if the fraction of additional time due to collisions in hash maps is ignored and the hash maps are large enough to have near constant time element removal). Further, each recursive call made by the processor 120 to UPDATE takes constant time and sets a separate edge in the graph. Thus, the total time for each loop in Algorithm 1 is $\mathcal{O}(n+1)$. The loop itself is over all edges in the graph or network which is $\mathcal{O}(n^2)$. Thus, the overall complexity of the algorithm is $\mathcal{O}(n^2(n+1))$, which is $\mathcal{O}(n^3)$, and is lower than the cost of $\mathcal{O}(n^3 \log(n))$ incurred by other methods, such as the Network Simplex based solutions. Thus, the system 100 in accordance with the present disclosure provides an improved efficiency in EMD computation, and reduces processing load on data protection systems by providing algorithms that can be executed with reduced complexity.

The Algorithm 1 and Algorithm 2 may be parts of the instructions 124 stored in the memory 122. In some examples, different processing units, such as processor cores, integrated circuits, software modules, may be assigned to perform different portions of the Algorithms 1, 2 described above. For example, a first processing unit may be configured to execute Algorithm 1 and a second processing unit may be configured to execute Algorithm 2. The assignment of different processing units to perform different portions of instructions 124 may depend on a desired implementation of the system 100.

Figure 3:
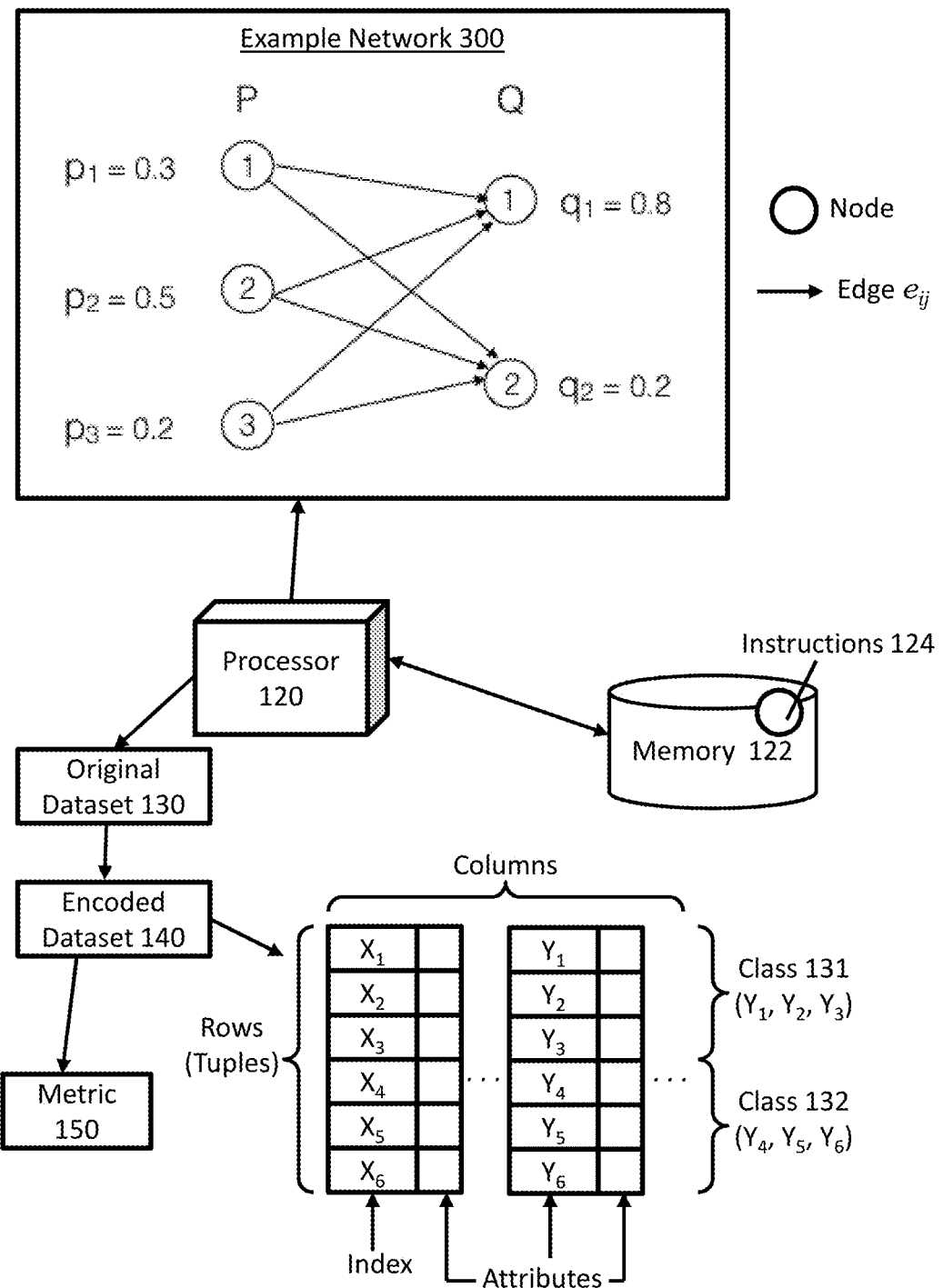
FIG. 3 illustrates a network of nodes and edges in accordance with an implementation of a data protection based on earth mover's distance, in one embodiment.

FIG. 3 illustrates a network of nodes and edges in accordance with an implementation of a data protection based on earth mover's distance, in one embodiment. FIG. 3 may include components that are labeled identically to components of FIGS. 1-2, which will not be described again for the purposes of clarity. The description of FIG. 3 may reference at least some of the components of FIGS. 1-2.

FIG. 3 illustrates a bipartite graph representing an example flow network 300 of a minimum-cost flow problem (MCFP). In the example network 300, P={0.3, 0.5, 0.2} and Q={0.8, 0.2}. The processor 120 may sort the set of edges $e_{ij}$ in a descending order of costs to generate the vector $E_s=\{e_{11}, e_{21}, e_{31}, e_{12}, e_{22}, e_{32}\}$. In some examples, the cost of the edges may be application specific. For example, the nodes of the network 200 may be embedded in a number space $R^n$(n-dimensional real-valued), such that the cost of links between the nodes may be its Euclidean or cosine distance. In another example, the nodes may be drawn from an ontology (e.g., cat, tiger, dog) and the costs may be provided by a domain expert (e.g., cost (cat, dog)=1, cost (tiger, dog)=1, cost (tiger, cat)=0.1 (since tiger is a type of cat)).

The processor 120 may execute Algorithm 1 to determine a flow assignment. The processor 120 may iteratively call the LOWERBOUND and/or the UPDATE functions (lines 3 and 4 of Algorithm 1) to assign flows to each edge of the vector $E_s$, in the descending order indicated by $E_s$. The flows for each edge are initialized to −1 and the values of each flow is stored in the matrix F. Thus, for this example shown in FIG. 3, the matrix F is initialized to a 3×2 matrix with all entries being −1. The processor 120 may start with isolating the first edge among $E_s$, which is $e_{11}$, or the edge with the least cost. The isolation of an edge, performed by the processor 120, may include storing a current value or flow of the isolated edge in a register and updating the register value during execution of Algorithm 1 and Algorithm 2. The processor 120 may call the LOWERBOUND function to solve Eqn. (19) and determine the flow $f_{11}$ as:

$$f_{11}=\max(0.3-0.2, 0.8-0.7, 0)=\max(0.1, 0.1, 0)=0.1$$

where max( ) is the selection of the maximum value among the three elements within the parenthesis). With $f_{11}=0.1$, the processor 120 may call the UPDATE function to adjust constraints in which $f_{11}$ occurs. For example, the processor 120 may update Eqns. (1), (4), (5), etc., with $f_{11}=0.1$.

For example, the constraint of Eqn. (4) indicates that a sum of $f_{ij}$ needs to be 1, such that $f_{11}+f_{12}+f_{21}+f_{22}+f_{31}+f_{32}=1$. Further, the constraint of Eqn. (2) and (3) indicate amount of outgoing flow from a node, or incoming flow to a node, equals the probability mass (value of $p_i$, $q_j$) of that node. Thus, the flow $f_{11}=0.1$ leads to $f_{12}=0.3-0.1=0.2$, because according to Eqn. (3), $f_{11}+f_{12}=p_1=0.3$. With $f_{11}=0.1$, and Eqn. (2) indicating $f_{11}+f_{21}+f_{31}=q_1$ the processor 120 may compute $0.1+f_{21}+f_{31}=0.8$ to determine $f_{21}+f_{31}=0.7$. Further, since the sum of all flows must be 1 (Eqn. (4)), $f_{11}+f_{21}+f_{31}=0.8$, and $f_{12}=0.2$, the processor 120 may determine that $f_{22}+f_{32}=0$. The processor 120 may conclude the UPDATE function for edge $e_{11}$, and may continue to assign flows by setting the next edge, which is $e_{21}$, in the vector $E_s$ as the "lower bound". The conclusion of the UPDATE function for edge $e_{11}$ results in the assignment of flows $\{f_{11}, f_{21}, f_{31}, f_{12}, f_{22}, f_{32}\}=\{0.1, f_{21}, f_{31}, 0.2, 0, 0\}$, where flows $f_{21}, f_{31}$ remains unknown (the only known information is $f_{21}+f_{31}=0.7$).

The processor 120 may continue to execute Algorithm 1 to compute Eqn. (19) for a next edge after $e_{11}$, which is $e_{21}$ among $E_s$. The processor 120 isolate the edge $e_{21}$, and may call the LOWERBOUND function to solve Eqn. (19) and determine the flow $f_{21}$ for edge $e_{21}$, such as $f_{21}=\max(0.5-0,$ 0.7-0.2, 0)=max(0.5, 0.5, 0)=0.5. Note that when $f_{12}$ is set to 0.2 then $q_2$ becomes 0.0 because a mass of 0.2 already flowed into $q_2$ via the edge $e_{12}$. Also, when $f_{11}$, is set to 0.1 then $q_1$ becomes 0.7 because a mass of 0.1 already flowed into $q_1$ via the edge $e_{11}$. The processor 120, based on $f_{21}+f_{31}=0.7$, may determine that $f_{31}=0.7-0.5=0.2$. The processor 120 may update the flows to $\{f_{11}, f_{21}, f_{31}, f_{12}, f_{22}, f_{32}\}=\{0.1, 0.3, 0.4, 0.2, 0, 0\}$. The processor 120, based on $f_{22}+f_{32}=0$, may determine that both $f_{22}$ and $f_{32}$ are 0. The processor 120 may perform a check to see if there are any remaining flows in matrix F that are unknown. In response to all flows being assigned with a value, the processor 120 may conclude a solution of assigning flows to edges in a descending order of $\{0.1, 0.2, 0.5, 0, 0.2, 0\}$.

The processor 120 may use the solution of $f_{ij}$ to compute Eqn. (6), and set the resulting EMD as the metric 150, which may be a distance measure between the distributions P and Q. If distributions P and Q are part of a dataset (e.g., the encoded dataset 140), the metric 150 determined from the solution of flow assignments may be compared with a threshold t to determine whether the dataset achieves t-closeness. Based on whether the dataset achieved t-closeness, the processor 120 may determine whether it is safe to publish the dataset or to output the dataset to the device 180.

Figure 4:
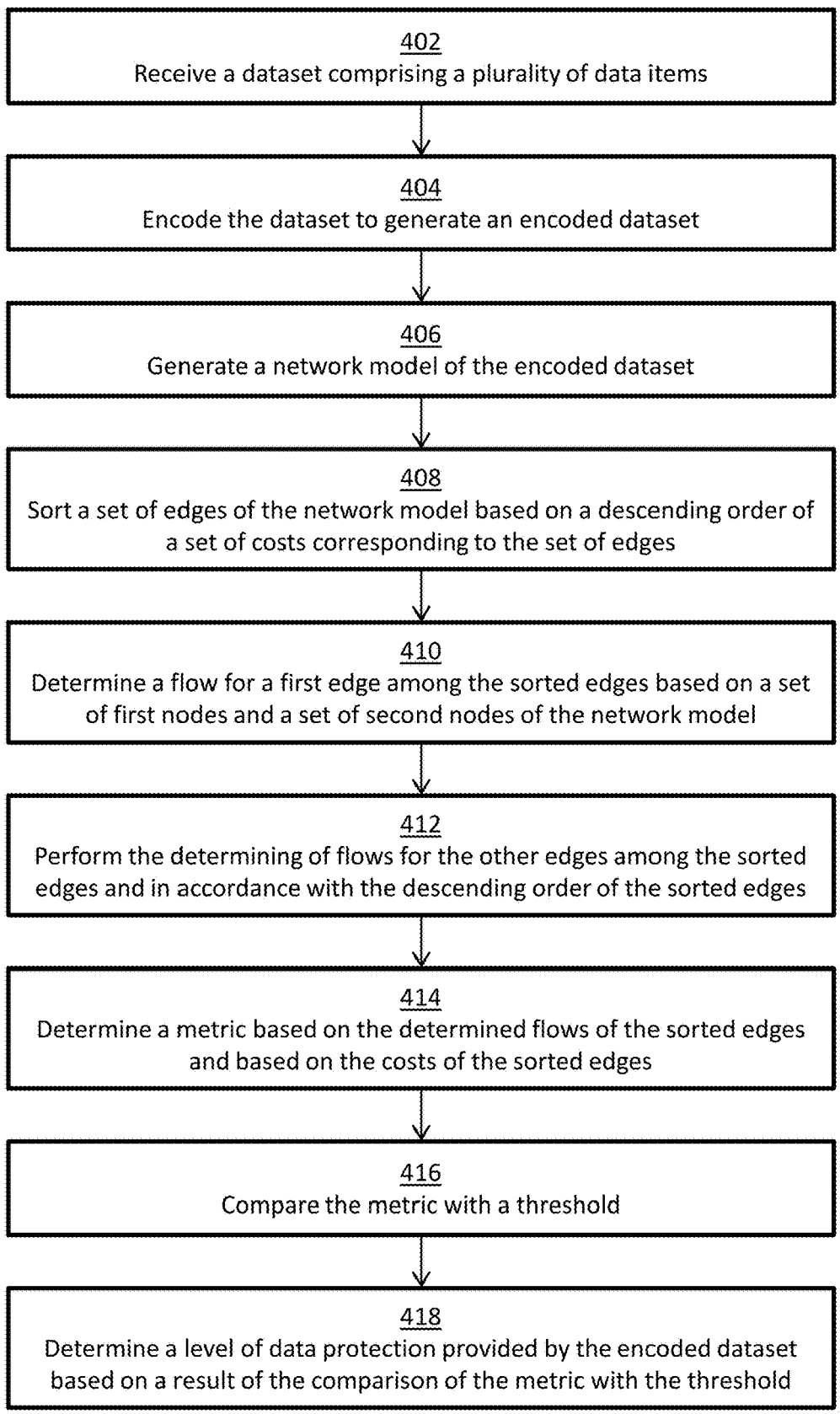
FIG. 4 illustrates a flow diagram relating to a process, in one embodiment, to implement a data protection based on earth mover's distance.

FIG. 4 illustrates a flow diagram relating to a process, in one embodiment, to implement a data protection based on earth mover's distance. The process in FIG. 4 may be implemented using, for example, computer system 100 discussed above. An example process may include one or more operations, actions, or functions as illustrated by one or more of blocks 402, 404, 406, 408, 410, 412, 414, 416, and/or 418. Although illustrated as discrete blocks, various blocks may be divided into additional blocks, combined into fewer blocks, eliminated, or performed in parallel, depending on the desired implementation.

Processing may begin at block 402, where a processor receives a dataset comprising a plurality of data items. Processing may continue from block 402 to block 404, where the processor encodes the dataset to generate an encoded dataset. Processing may continue from block 404 to block 406, where the processor generates a network model of the encoded dataset. The network model includes a set of first nodes representing a first distribution of an attribute among a portion of the encoded dataset. The network model further includes a set of second nodes representing a second distribution of the attribute among the entire encoded dataset. The network model further includes a set of edges, where an edge connects one of the first nodes to one of the second nodes, the set of edges are directed edges directed from a connected first node to a connected second node, and the set of edges correspond to a set of costs.

Processing may continue from block 406 to block 408, where the processor sorts the set of edges of the network model based on a descending order of the set of costs corresponding to the set of edges. Processing may continue from block 408 to block 410, where the processor determines a flow for a first edge among the sorted edges based on a set of first nodes and a set of second nodes of the network model. Processing may continue from block 410 to block 412, where the processor performs the determining of flows for the other edges among the sorted edges and in accordance with the descending order of the sorted edges. Processing may continue from block 412 to block 414, where the processor determines a metric based on the determined flows of the sorted edges and based on the costs of the sorted edges. Processing may continue from block 414 to block 416, where the processor compares the metric with a threshold. Processing may continue from block 416 to block 416, where the processor may determines a level of data protection provided by the encoded dataset based on a result of the comparison of the metric with the threshold.

Figure 5:
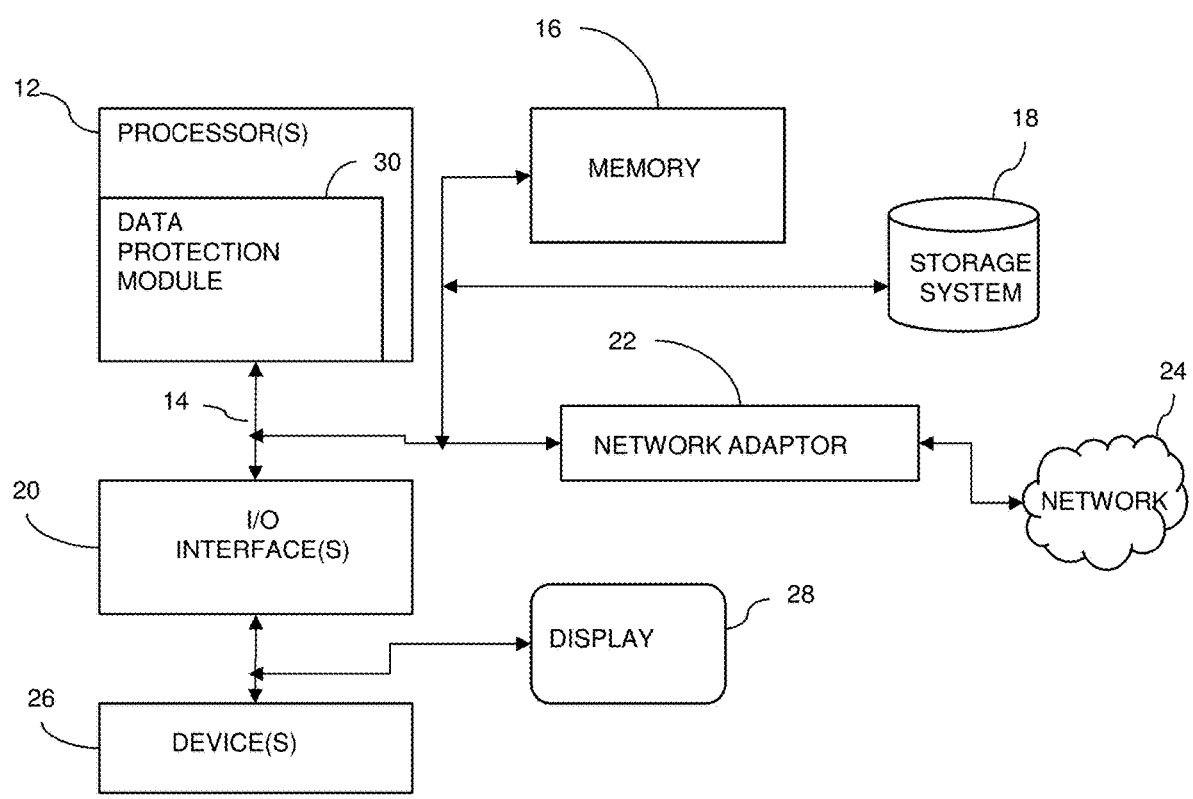
FIG. 5 illustrates a schematic of an example computer or processing system that may implement a data protection based on earth mover's distance, in one embodiment.

FIG. 5 illustrates a schematic of an example computer or processing system that may implement a data protection based on earth mover's distance, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., data protection module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 6:
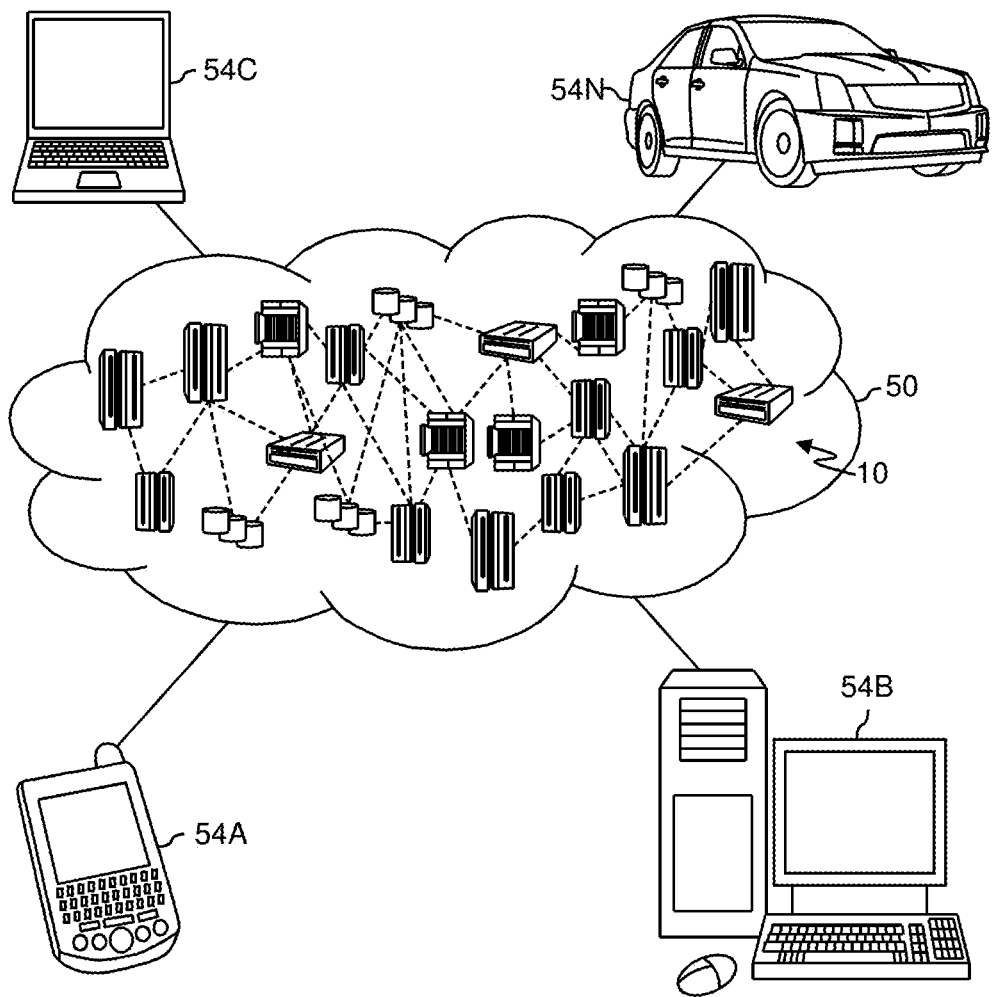
FIG. 6 depicts a cloud computing environment according to an embodiment of the present invention.

FIG. 6 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
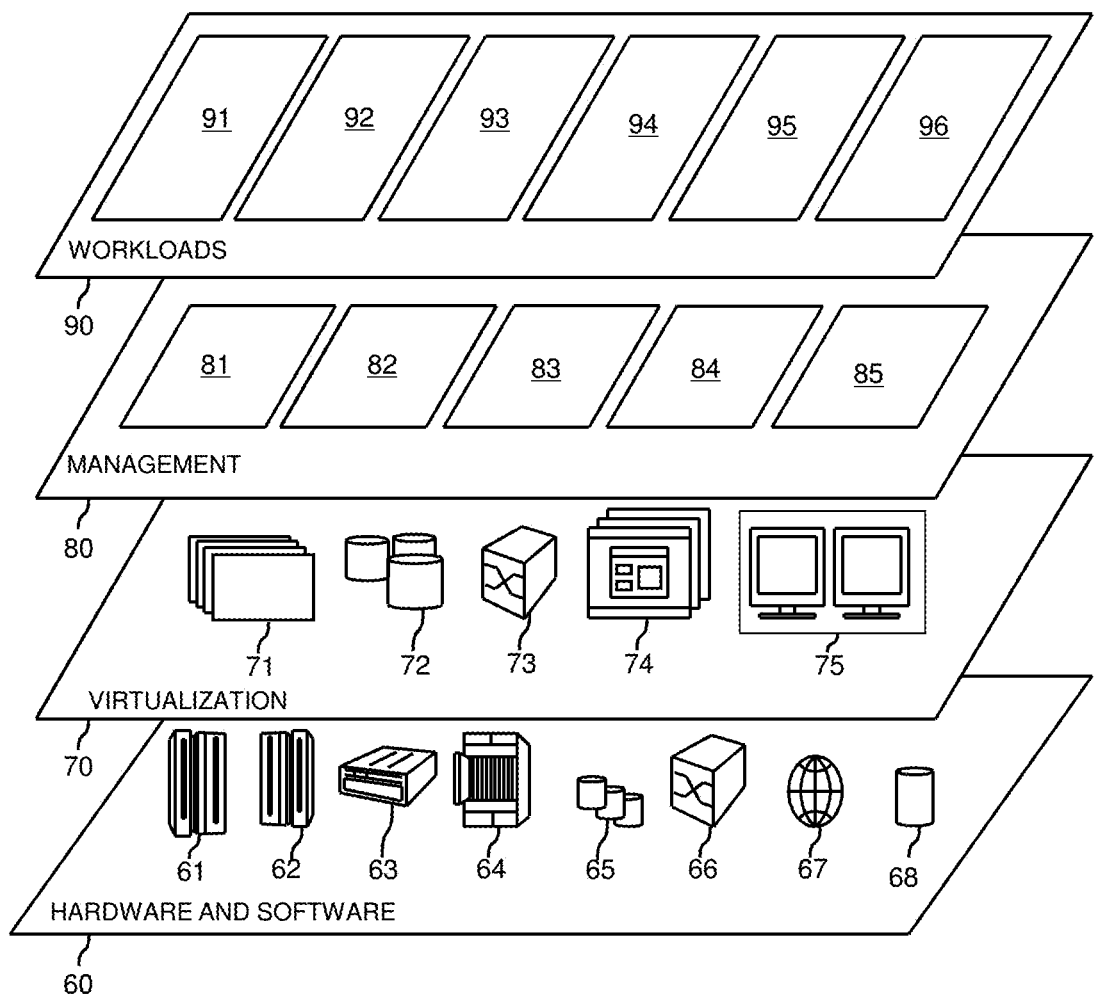
FIG. 7 depicts abstraction model layers according to an embodiment of the present invention.

FIG. 7 depicts abstraction model layers according to an embodiment of the present invention. Referring now to FIG. 7 a set of functional abstraction layers provided by cloud computing environment 50 (FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
generating, by a processor, a network model of a dataset, the network model provides:
a set of first nodes representing a first distribution of an attribute among a portion of the dataset;
a set of second nodes representing a second distribution of the attribute among the dataset;
a set of edges, wherein an edge connects one of the first nodes to one of the second nodes, the set of edges are directed from a connected first node to a connected second node, and the set of edges correspond to a set of costs;
sorting, by the processor, the set of edges based on a descending order of the set of costs;
determining, by the processor, a flow for a first edge among the sorted edges based on the set of first nodes and the set of second nodes, wherein the first edge corresponds to a least cost, and the flow is a portion of a mass of a first node connected by the first edge;
iteratively performing, by the processor, the determining of flows for the other edges among the sorted edges and in accordance with the descending order of the sorted edges;
determining, by the processor, a metric based on the determined flows of the sorted edges and based on the costs of the sorted edges; and
determining, by the processor, a level of data protection provided by the dataset based on a result of a comparison of the metric with a threshold.

2. The computer-implemented method of claim 1, wherein the threshold indicates a similarity degree, and the level of data protection is compliant if the metric indicates a similarity degree satisfying the threshold.

3. The computer-implemented method of claim 1, further comprising outputting, by the processor, the dataset to a device in response to the level of data protection being compliant.

4. The computer-implemented method of claim 1, wherein the determining the flow for the first edge comprises:
determining, by the processor, a first difference between the mass of the first node connected by the first edge and a sum of the masses of the set of second nodes excluding a second node connected by the first edge;

determining, by the processor, a second difference between a mass of the second node connected by the first edge and a sum of the masses of the set of first nodes excluding the first node connected by the first edge;

selecting, by the processor, a largest value among the first difference, the second difference, and the value zero, as the flow of the first edge.

5. The computer-implemented method of claim 1, further comprising:

determining, by the processor, the flow of the first edge based on a set of constraints;

updating, by the processor, the set of constraints based on the determined flow of the first edge; and determining, by the processor, a flow for a second edge of the sorted edges based on the updated constraints.

6. The computer-implemented method of claim 1, wherein the masses of the first nodes and the second nodes are stored as hash maps in a memory.

7. The computer-implemented method of claim 1, further comprising restricting, by the processor, an output of the dataset in response to the level of data protection being noncompliant.

8. A system comprising:

a memory;

a hardware processor configured to be in communication with the memory, the hardware processor being configured to:

generate a network model of a dataset, the network model provides:

a set of first nodes representing a first distribution of an attribute among a portion of the dataset;

a set of second nodes representing a second distribution of the attribute among the dataset;

a set of edges, wherein an edge connects one of the first nodes to one of the second nodes, the set of edges are directed from a connected first node to a connected second node, and the set of edges correspond to a set of costs;

sort the set of edges based on a descending order of the set of costs;

determine a flow for a first edge among the sorted edges based on the set of first nodes and the set of second nodes, wherein the first edge corresponds to a least cost, and the flow is a portion of a mass of a first node connected by the first edge;

iteratively perform the determination of flows for the other edges among the sorted edges and in accordance with the descending order of the sorted edges;

determine a metric based on the determined flows of the sorted edges and based on the costs of the sorted edges; and determine a level of data protection provided by the dataset based on a result of a comparison of the metric with a threshold.

9. The system of claim 8, wherein the threshold indicates a similarity degree, and the level of data protection is compliant if the metric indicates a similarity degree satisfying the threshold.

10. The system of claim 8, wherein the hardware processor is configured to output the dataset to a device in response to the level of data protection being compliant.

11. The system of claim 8, wherein the hardware processor is configured to:

determine a first difference between the mass of the first node connected by the first edge and a sum of the masses of the set of second nodes excluding a second node connected by the first edge;

determine a second difference between a mass of the second node connected by the first edge and a sum of the masses of the set of first nodes excluding the first node connected by the first edge;

select a largest value among the first difference, the second difference, and the value zero, as the flow of the first edge.

12. The system of claim 8, wherein the hardware processor is configured to:

determine the flow of the first edge based on a set of constraints;

update the set of constraints based on the determined flow of the first edge; and determine a flow for a second edge of the sorted edges based on the updated constraints.

13. The system of claim 8, wherein the attribute values of the first nodes and the second nodes are stored as hash maps in the memory.

14. The system of claim 8, wherein the hardware processor is further configured to an output of the dataset in response to the level of data protection being noncompliant.

15. A computer program product for determining whether a dataset satisfies a data protection requirement, the computer program product comprising a computer readable storage medium having program instructions embodied therewith, the program instructions executable by a processing element of a device to cause the device to:

generate, by the device, a network model of a dataset, the network model provides:

a set of first nodes representing a first distribution of an attribute among a portion of the dataset;

a set of second nodes representing a second distribution of the attribute among the dataset;

a set of edges, wherein an edge connects one of the first nodes to one of the second nodes, the set of edges are directed from a connected first node to a connected second node, and the set of edges correspond to a set of costs;

sort, by the device, the set of edges based on a descending order of the set of costs;

determine, by the device, a flow for a first edge among the sorted edges based on the set of first nodes and the set of second nodes, wherein the first edge corresponds to a least cost, and the flow is a portion of a mass of a first node connected by the first edge;

iteratively perform, by the device, the determination of flows for the other edges among the sorted edges and in accordance with the descending order of the sorted edges;

determine, by the device, a metric based on the determined flows of the sorted edges and based on the costs of the sorted edges; and determine, by the device, a level of data protection provided by the dataset based on a result of a comparison of the metric with a threshold.

16. The computer program product of claim 15, wherein the threshold indicates a similarity degree, and the level of data protection is compliant if the metric indicates a similarity degree satisfying the threshold.

17. The computer program product of claim 15, wherein the program instructions are further executable by the processing element of the device to cause the device to output the dataset to a device in response to the level of data protection being compliant.

18. The computer program product of claim 15, wherein the program instructions are further executable by the processing element of the device to cause the device to:
   determine a first difference between the mass of the first node connected by the first edge and a sum of the masses of the set of second nodes excluding a second node connected by the first edge;
   determine a second difference between a mass of the second node connected by the first edge and a sum of the masses of the set of first nodes excluding the first node connected by the first edge;
   select a largest value among the first difference, the second difference, and the value zero, as the flow of the first edge.

19. The computer program product of claim 15, wherein the program instructions are further executable by the processing element of the device to cause the device to:
   determine the flow of the first edge based on a set of constraints;
   update the set of constraints based on the determined flow of the first edge; and
   determine a flow for a second edge of the sorted edges based on the updated constraints.

20. The computer program product of claim 15, wherein the program instructions are further executable by the processing element of the device to cause the device to restrict an output of the dataset in response to the level of data protection being noncompliant.

* * * * *